Figure 1:
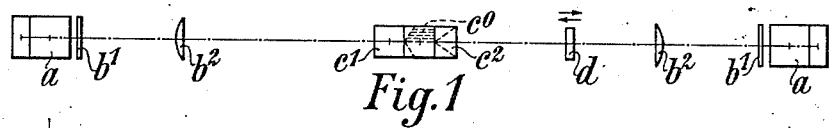

O. EPPENSTEIN.
TELEMETER.
APPLICATION FILED JAN. 27, 1913.

1,099,432.  Patented June 9, 1914.

Witnesses:
Paul Krüger
Richard Hahn

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

1,099,432.
Specification of Letters Patent.
Patented June 9, 1914.

Application filed January 27, 1913. Serial No. 744,546.

*To all whom it may concern:*

Be it known that I, OTTO EPPENSTEIN, a citizen of the German Empire, residing at Jena, Germany, have invented a new and useful Telemeter, of which the following is a specification.

The invention relates to telemeters, which are intended for a single observer and contain a telescope system presenting two images of the object, the range of which is to be found. With these instruments measurement proceeds from the angle, which is subtended in the plane of triangulation by the base-line. In the apex of this angle the object may be located; in this case a baseline telemeter in a restricted sense is in question. The apex of the angle may, however, lie at the locus of the observer, i. e. in the instrument, when in the well-known manner a measuring of the object in a direction perpendicular to the sighting direction is presupposed as base-line. For both cases the rule obtains, that the angle in general enters so much the more accurately into the measurement, the more powerful the magnification of the images. A limit is, however, set to an increase by this means in the accuracy of measurement, by an increase in the magnification being necessarily attended with a corresponding limitation of the objective field of vision, the orientation in the landscape being rendered less easy.

In the telemeter according to the present invention a telescope system is employed, the images of which have a more powerful magnification in the direction parallel to the plane of triangulation than in the direction perpendicular to the same. The magnification perpendicular to the plane of triangulation has no influence on the accuracy of measurement, this accuracy being in direct proportion to the magnification parallel to the plane of triangulation. Hence in the new telemeter the drawback objected to is at least partly avoided, in so far as the limitation of the objective field of vision only takes place in the direction parallel to the plane of triangulation. Inversely, if the new telemeter be compared with an old one having the same magnification parallel to the plane of triangulation, its advantage consists in the widening of the objective field of vision perpendicular to the plane of triangulation.

The creation of sharply defined images having two different magnifications, i. e. of distorted images, by means of optical instruments in general is the subject of the German patent specification 99722; the applicability of the means given in the said specification to telescopes is mentioned on page 5, lines 7 to 11. According to the said specification, there are available, as the simplest means for obtaining an image-distortion, cylindrical lenses and refracting prisms, which in suitable combinations may either take the place of spherical lenses or may be added to the spherical lenses. Hence one of the well-known telemeters may be given an image-distortion corresponding to the invention, by, e. g., replacing each of its objectives by two collective cylindrical lenses, the focal lengths of which are related to each other as the two magnifications aimed at. These two cylindrical lenses are to be disposed in such a manner that their back focal planes coincide, their axes of rotation are perpendicular to each other and the axis of rotation of the lens having the shorter focal length is parallel to the plane of triangulation. For reducing the image-errors the cylindrical lenses may be combined in any of the well-known ways. The image-distortion may also be brought about in the ocular system, by, e. g., replacing the eye-lens or, in terrestrial oculars, the lens of reversion by a system of cylindrical lenses as described above. Where such a system is to replace a lens of reversion, the axis of rotation of the cylindrical lens of shorter focal length must in this case too be parallel to the plane of triangulation, where, on the other hand, an eye-lens is to be replaced, the axis referred to must be perpendicular to the plane of triangulation. When the images are to be formed by pencils of wide opening, it will be found appropriate to leave the collective effect principally to spherical lenses and to produce the distorting effect by additional systems (*cf.* the German patent specification 99722, page 5, lines 85 to 89). Such additional systems may, e. g., consist of two cylindrical lenses, which are disposed so as to have their axes of rotation parallel to each other and for the rest in such a manner, that they will coact, when both are collective lenses, as in an astronomical telescope, but when one of them is a dispersive lens, as in a Galilean telescope. This property of the additional systems is accompanied, in the case of two collective members, besides by the distortion also by an inversion of the image in the direction perpendicular to the axes of rotation of the members. The ratio between the focal lengths of the members depends on the ratio of the two magnifications required. It is equal to the latter ratio, when the additional system, on account of its being in the path of parallel rays, e. g. in front of the objective or behind the ocular, is formed as a telescopic system. According as the member having the lesser focal length is located in front or behind, the system causes reduction or magnification in the direction perpendicular to the axes of rotation of the cylindrical members. A magnifying system is to be disposed with its axes of rotation perpendicular to the plane of triangulation, in the case of a reducing system the said axes must lie parallel to the said plane. An achromatic set of prisms having a distorting effect also represents a simple form of an additional system; it may, however, be located only where exact or almost exact parallelism obtains among the rays of each pencil, if indeed sharp definition of the images is to be obtainable. The refracting edges of a magnifying set of prisms must be disposed perpendicularly to the plane of triangulation, those of a reducing set must lie parallel to the said plane. The employment of additional cylindrical lenses with coincidence telemeters having separated images is known. The object of these lenses was to change the images of indistinct or punctual objects into stripes, which lie perpendicular to the line of coincidence, in order to facilitate the finding of the ranges of such objects. These images were, however, not sharply defined, as in them the object-points were not reproduced by points, but by lines; the distortion also always had the opposite sense to what it has according to the present invention.

Figure 2:
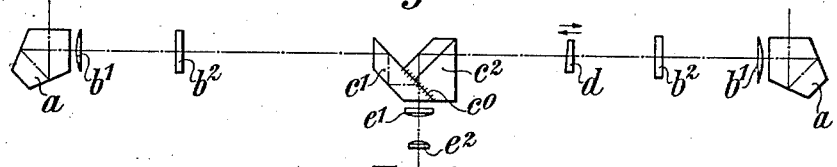
Figure 3:
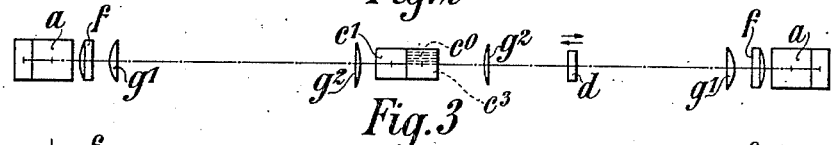
Figure 4:
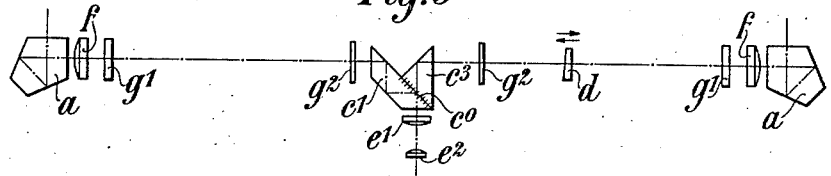
Figure 5:
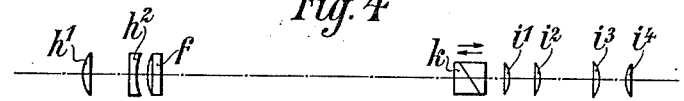
Figure 6:
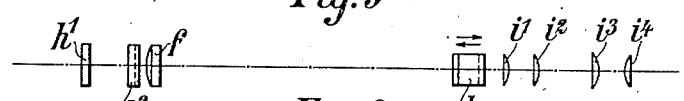
Figure 7:
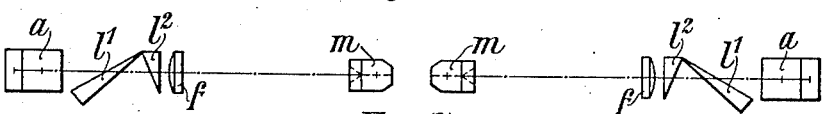
Figure 8:
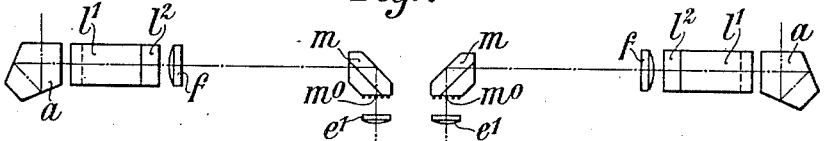

In the annexed drawing: Figures 1 and 2 show diagrammatically in elevation and in plan respectively the optical system of an example of the telemeter according to the invention. Figs. 3 and 4 are similar views of a second form of the telemeter. Figs. 5 and 6 are similar views of a third form of the telemeter. Figs. 7 and 8 are similar views of a fourth form of the telemeter.

Image distortion is obtained in the first example by spherical lenses being replaced by cylindrical ones while the same result is brought about in the other examples by the employment of additional systems.

The optical system according to Figs. 1 and 2 is that of a coincidence telemeter with separated images, the lower one of which, belonging to the right-hand end of the base-line, is completely erected and the other one has remained inverted in the direction perpendicular to the plane of triangulation. In place of a spherical objective lens and behind either of the two objective prisms $a$ a pair of collective cylindrical lenses $b^1$, $b^2$ having crossed axes of rotation is disposed. The rear focal points of both the left-hand and right-hand cylindrical lenses coincide with the cement-layer $c^0$ of a separating prism system $c^1$, $c^2$. A longitudinally displaceable glass wedge $d$ indicates the measuring device, and the pair of lenses $e^1$, $e^2$, shown only in the plan view (Fig. 2), an astronomical telescope.

In Figs. 3 and 4 the optical system is that of a coincidence telemeter with separated images, both of which are completely erected. In this case a reducing system is interposed between each objective lens $f$ and the separating prism system $c^1$, $c^3$, each reducing system being composed, in the manner of an astronomical telescope, of two collective cylindrical lenses, a more powerful one $g^1$ and a less powerful one $g^2$. The axes of rotation of these lenses are parallel to each other and to the plane of triangulation. The powers of the objective lenses and the lenses of the additional systems are so proportioned, and the said lenses are so disposed that the focal point of each of the two total systems lies both as regards the plane meridianal pencil, which is parallel to the plane of triangulation and as regards that one, which is perpendicular to the same, in the cement-layer $c^0$ of the separating prism system.

In the double-image telemeter, Figs. 5 and 6, in front of the objective $f$ there is disposed a system, which is magnifying, telescopic and composed after the manner of a Galilean telescope of a collective cylindrical lens $h^1$ and a dispersive one $h^2$ with parallel axes of rotation. A Rochon-prism $k$ displaceable in the direction of the optical axis and presenting two images of the object, the range of which is to be found, lies between the objective and the terrestrial ocular, which latter is indicated by the four lenses $i^1$, $i^2$, $i^3$ and $i^4$. The plane of principal section of the prism, hence also each line connecting corresponding points of both images, lies perpendicularly to the axes of rotation of the cylindrical lenses. For measuring the instrument is turned in the well-known manner into such a position that the base-line belonging to the object, the range of which is to be found, lies parallel to the said connecting lines; the range is found, by bringing about coincidence between one end of one image of the base-line and the other end of its other image through displacing the prism.

In the stereoscopic telemeter, Figs. 7 and 8, a Brewster set of prisms $l^1$, $l^2$, the principal section of which is perpendicular to the plane of triangulation, is interposed between either objective prism $a$ and the corresponding objective lens $f$ in such a manner as to have a magnifying effect. The two ocular prisms $m$ carry the mark-systems $m^0$, the images of which produce in the well-known manner a stereoscopic range-scale.

I claim:

In a telemeter a telescope system presenting two images of an object, the said system comprising means adapted to magnify the said images more powerfully in the direction parallel to the plane of triangulation than in the direction perpendicular to the same.

OTTO EPPENSTEIN.

Witnesses:
PAUL KRÜGER,
FRITZ SANDER.